US010929348B2

(12) United States Patent
Bates-Haus et al.

(10) Patent No.: US 10,929,348 B2
(45) Date of Patent: *Feb. 23, 2021

(54) METHOD AND SYSTEM FOR LARGE SCALE DATA CURATION

(71) Applicant: Tamr, Inc., Cambridge, MA (US)

(72) Inventors: Nikolaus Bates-Haus, Littleton, MA (US); George Beskales, Waltham, MA (US); Daniel Meir Bruckner, San Francisco, CA (US); Ihab F. Ilyas, Waterloo (CA); Alexander Richter Pagan, Woodside, NY (US); Michael Ralph Stonebraker, Moultonborough, NH (US)

(73) Assignee: TAMR, INC., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/359,795

(22) Filed: Nov. 23, 2016

(65) Prior Publication Data

US 2017/0075918 A1 Mar. 16, 2017

Related U.S. Application Data

(63) Continuation of application No. 14/228,546, filed on Mar. 28, 2014, now Pat. No. 9,542,412.

(51) Int. Cl.
*G06F 16/21* (2019.01)
*G06F 16/174* (2019.01)
*G06F 16/215* (2019.01)

(52) U.S. Cl.
CPC ........ *G06F 16/1748* (2019.01); *G06F 16/215* (2019.01)

(58) Field of Classification Search
CPC ............ G06F 17/30303; G06F 16/215; G06F 16/285; G06F 16/35; G06F 16/211; G06F 16/24564

See application file for complete search history.

(56) References Cited

U.S. PATENT DOCUMENTS

| 6,567,814 B1 | 5/2003 | Bankier et al. |
| 8,799,235 B2* | 8/2014 | Kacher ............. G06F 17/30303 707/687 |
| 9,081,817 B2* | 7/2015 | Arasu ............... G06F 17/30507 |
| 2005/0246330 A1 | 11/2005 | Giang et al. |

(Continued)

FOREIGN PATENT DOCUMENTS

WO 2014012576 A1 1/2014

OTHER PUBLICATIONS

Bilenko et al. "Adaptive Blocking: Learning to Scale up Record Linkage", IIWeb-2006 Edinburgh, Scotland.*

(Continued)

*Primary Examiner* — Etienne P Leroux
*Assistant Examiner* — Cindy Nguyen
(74) *Attorney, Agent, or Firm* — Panitch Schwarze Belisario & Nadel LLP

(57) ABSTRACT

An end-to-end data curation system and the various methods used in linking, matching, and cleaning large-scale data sources. The goal of this system is to provide scalable and efficient record deduplication. The system uses a crowd of experts to train the system. The system operator can optionally provide a set of hints to reduce the number of questions sent to the experts. The system solves the problem of schema mapping and record deduplication in a holistic way by unifying these problems into a unified linkage problem.

3 Claims, 5 Drawing Sheets

(56) References Cited

U.S. PATENT DOCUMENTS

| | | | |
|---|---|---|---|
| 2010/0049728 A1* | 2/2010 | Chiticariu | G06F 16/258 707/803 |
| 2010/0145902 A1 | 6/2010 | Boyan et al. | |
| 2010/0179930 A1 | 7/2010 | Teller et al. | |
| 2010/0322518 A1 | 12/2010 | Prasad et al. | |
| 2010/0325134 A1* | 12/2010 | Galfond | G06F 17/30693 707/759 |
| 2012/0259802 A1* | 10/2012 | Arasu | G06F 17/30507 706/12 |
| 2012/0278263 A1* | 11/2012 | Borthwick | G06N 7/005 706/12 |
| 2013/0110884 A1 | 5/2013 | Eakins | |
| 2013/0144605 A1 | 6/2013 | Brager et al. | |
| 2013/0173560 A1 | 7/2013 | McNeill et al. | |
| 2013/0212103 A1 | 8/2013 | Cao et al. | |
| 2013/0275393 A1 | 10/2013 | Kaldas et al. | |
| 2013/0332194 A1 | 12/2013 | D'Auria et al. | |

OTHER PUBLICATIONS

"Efficient Record Linkage in Large Data sets", Department of Information and Computer Science, University of California, Irvine, CA92697, USA, Liang Jin et al., Apr. 3, 2017 (hereafter Liang).*

Ektefa et al. "A Comparative study in classification techniques for unsupervised Record Linkage Model", copyright 2011 Science Publications.*

Julie Harris "Next Generation Linkage Management System", Proceedings of the Sixth Australasian workshop on Health informatics and Knowledge Management, Adelaide, Australia, Copyright 2013.*

Nigel et al. ("A Preliminary Performance Comparison of Five Machine Learning Algorithms for Practical IP Traffic Flow Classification" ACM Sigcomm computer Communication, vol. 36, No. 5, Oct. 2006.*

German Creamer "Linking entity resolution and risk" Stevens Institute of Technology , Oct. 11, 2010.*

Heise et al., "Integrating Open Government Data with Stratosphere for more Transparency," Preprint submitted to Journal of Web Semantics, Hasso Plattner Institute, Potsdam, Germany, pp. 1-17 (Jan. 19, 2012).

International Preliminary Report on Patentability dated Oct. 4, 2016 in International Application No. PCT/US2015/021760.

International Search Report dated Jun. 24, 2015 in International Application No. PCT/US2015/021760.

Li et al., "Supporting Efficient Record Linkage for Large Data Sets Using Mapping Techniques," ICS 424B, University of California, Irvine, CA 92697, USA, pp. 1-25 (Apr. 3, 2007).

* cited by examiner

METHOD AND SYSTEM FOR LARGE SCALE DATA CURATION

CROSS-REFERENCE TO RELATED APPLICATIONS

This continuation patent application claims priority from U.S. patent application Ser. No. 14/228,546, filed Mar. 28, 2014, titled "METHOD AND SYSTEM FOR LARGE SCALE DATA CURATION" and naming inventors Nikolaus Bates-Haus, George Beskales, Daniel Meir Bruckner, Ihab F. Ilyas, Alexander Richter Pagan, and Michael Ralph Stonebraker.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2016 Tamr, Inc.

BACKGROUND OF THE INVENTION

Field of the Invention

This invention relates to cleaning, transforming, integrating, and deduplicating data from multiple data sources. Products and services embodying the invention operate in the markets including data cleaning, record deduplication, data integration, data quality, and data transformation.

Background

Systems such as those provided by Informatica, Oracle's Silver Creek Systems, and IBM InfoSphere QualityStage are used to integrate data coming from different data sources, standardize data formats (e.g., dates and addresses), and remove errors from data (e.g., duplicates). These systems typically depend on a data expert (i.e., a human that has knowledge about the semantics of the data) to manually specify low-level procedures to clean the data. Coming up with an efficient and effective data integration plan mainly depends on the skills of the data expert. The audience targeted by such systems are assumed to be extremely familiar with the data (e.g., experienced in data analytics).

Modern data integration problems, on the other hand, impose stricter requirements. The system operator should not have to be a data expert. Also, the quality and the efficiency of the system should not depend on the expertise of the system operator(s).

DESCRIPTION OF PRIOR ART

Some problems in this area have been addressed by patent documents, including the following.

PATENTS

U.S. Pat. No. 6,567,814 "METHOD AND APPARATUS FOR KNOWLEDGE DISCOVERY IN DATABASES" (Bankier et al., May 20, 2003) discloses, in the Abstract, "A computer-based method and apparatus for knowledge discovery from databases. The disclosed method involves the user creation of a project plan comprising a plurality of operational components adapted to cooperatively extract desired information from a database. In one embodiment, the project plan is created within a graphical user interface and consists of objects representing the various functional components of the overall plan interconnected by links representing the flow of data from the data source to a data sink. Data visualization components may be inserted essentially anywhere in the project plan. One or more data links in the project plan may be designated as caching links which maintain copies of the data flowing across them, such that the cached data is available to other components in the project plan. In one embodiment, compression technology is applied to reduce the overall size of the database."

The problem that this patent is directed at solving is considered one type of knowledge discovery. The scope of the system proposed in this patent is broad, which precludes any benefit for the specific problem of data integration. The system in this patent addresses a highly experienced audience who is referred to as a data analyst. Using the system for data integration involves a large amount of manual effort (e.g., selecting which machine learning algorithm to use, what training data to collect, what blocking (i.e., candidate generation) criteria to use). Also, the system assumes that the user is extremely familiar with the data, which is not necessarily the case in practice. Because of the broad scope of this system, it is inefficient for large scale data curation.

PATENT APPLICATIONS

United States Patent Application 20100145902A1 "METHODS AND SYSTEMS TO TRAIN MODELS TO EXTRACT AND INTEGRATE INFORMATION FROM DATA SOURCES" (BOYAN et al., Jun. 10, 2010) discloses, in the Abstract, "Methods and systems to model and acquire data from a variety of data and information sources, to integrate the data into a structured database, and to manage the continuing reintegration of updated data from those sources over time. For any given domain, a variety of individual information and data sources that contain information relevant to the schema can be identified. Data elements associated with a schema may be identified in a training source, such as by user tagging. A formal grammar may be induced appropriate to the schema and layout of the training source. A Hidden Markov Model (HMM) corresponding to the grammar may learn where in the sources the elements can be found. The system can automatically mutate its schema into a grammar matching the structure of the source documents. By following an inverse transformation sequence, data that is parsed by the mutated grammar can be fit back into the original grammar structure, matching the original data schema defined through domain modeling. Features disclosed herein may be implemented with respect to web-scraping and data acquisition, and to represent data in support of data-editing and data-merging tasks. A schema may be defined with respect to a graph-based domain model."

This patent application mainly focuses on extracting entities from free text (e.g., web sites). There is limited discussion about record deduplication at paragraphs 0183-0186. However, this system does not handle structured data such as relational data, where data sources have specific structure composed of sets of tables, each of which has a certain schema and a set of records. Integrating structured data requires sophisticated handling of different attributes. For example, the attributes have to be weighted differently based on their importance for the data integration task.

United States Patent Application 20100179930A1 "METHOD AND SYSTEM FOR DEVELOPING PREDICTIONS FROM DISPARATE DATA SOURCES USING INTELLIGENT PROCESSING" (Teller et al., Jul. 15, 2010) discloses, in the Abstract, "Provided herein is a platform for prediction based on extraction of features and observations collected from a large number of disparate data sources that uses machine learning to reinforce quality of collection, prediction and action based on those predictions."

This patent application focuses on "feature selection," which is basically selecting which features (e.g., attributes) should be used for a specific classification/prediction task. The bigger problem, which is performing end-to-end data integration in an efficient way, is not addressed in this patent application.

United States Patent Application 20130332194Al "METHODS AND SYSTEMS FOR ADAPTIVE EHR DATA INTEGRATION, QUERY, ANALYSIS, REPORTING, AND CROWDSOURCED EHR APPLICATION DEVELOPMENT" (D'Auria et al., Dec. 12, 2013) discloses, in the Abstract, "A method, system, and computer program is provided for interacting with electronic medical health records. The method, system, and computer program may be configured to receive healthcare-related information including financial, patient, and provider related information from at least one electronic source. The healthcare-related information may be electronic health records, and may also be other information such as non-clinical data and environmental monitors. The method, system, and computer program may be further configured to determine a performance indicator of the health-care related information. The method, system, and computer program may be further configured to identify one or more corrective measures based on the performance indicator." This patent application focuses on the schema mapping problem only. It does not provide a solution to the record deduplication problem, which is an integral part of the data curation problem.

PCT Patent Application WO2014012576 A1 "A METHOD AND SYSTEM FOR INTEGRATING DATA INTO A DATABASE" (Beskales et al., Jan. 23, 2014) discloses, in the Abstract, "A method and system for integrating data into a database (6) comprises storing data from a plurality of data sources (S1,Si). The system comprises a rule learning module (1) and a duplicate elimination module (2). The rule learning module (1) operates in an initial rule learning stage. The duplicate elimination module (2) then operates in a de-duplication stage using the learnt rules. The de-duplication rules use conditional probability to determine the probability of records in the data sources (S1,Si) being duplicates of one another. Duplicate records are integrated and stored in the integrated database (6)."

Although the goal of this patent application is large scale data curation, the methods used to achieve such goal differ and do not scale. For example, candidate generation in Beskales is a simplified version of the DNF candidate generation, where each clause is restricted one term only. Also, Beskales focuses on record deduplication only, while ignoring its interdependency with schema mapping. Finally, Beskales assumes that only one expert performs the system training, not a crowd of experts for training.

None of the above provides system with:
(a) Efficient data integration (including schema mapping and record deduplication) that scales to thousands of data sources and hundreds of millions of records;
(b) Successful and efficient data integration that is independent of user skills and machine learning knowledge;
(c) Separation between users (system operators and data experts); and
(d) High quality results for both schema mapping and record deduplication for the case of having heterogeneous relational data sources with missing values and/or dirty/noisy data.

What is needed, therefore, is a system that overcomes the above-mentioned limitations and that includes the features enumerated above.

BRIEF SUMMARY OF THE INVENTION

This document describes an end-to-end data curation system and the various methods used in linking, matching, and cleaning large-scale data sources. This document contains the details of the techniques used in obtaining training data for the machine learning algorithms, a unified methodology for linking attributes and database records in a holistic fashion, multiple methods for pruning the large space of candidate matches for scalability and high data volume considerations, and novel ways to generate highly relevant questions for experts across all stages of the data curation lifecycle.

The system allows integrating a large number of data sources by normalizing, cleaning, integrating, and deduplicating these data sources. The system makes a clear separation between the system operator, who is responsible for operating the system (e.g., ingesting data sources, triggering data integration tasks), and data experts who have enough expertise to answer specific questions about the data.

Features and Advantages

A first feature is unified object linkage. The system described herein abstracts schema mapping and record deduplication as object linkage, where an object could refer to a column (i.e., field/attribute) or a row (i.e., a record) in a data source. Such abstraction allows seamless data integration between solutions of both problems. This data integration allows solving the two problems in a holistic way rather than one problem at a time.

More specifically, this feature involves an algorithm that iterates between linking attributes and linking records in order to achieve both better schema mapping results and record deduplication results.

A second feature is an efficient and effective method for implementing object linkage.

More specifically, this feature involves:
(a) A method for generating candidate record matches in a highly effective and scalable way using a set of rules represented as a Boolean formula in disjunctive normal form (DNF) in terms of attribute similarity predicates;
(b) A method to discover an (initial) set of DNF rules based on data statistics and optional data expert hints, where such rules guarantee high recall (low number of false negatives) and moderate precision (moderate number of false positives);
(c) A method for collecting data expert hints in the form of keys and anti-keys to be used by method (b);
(d) A method to discover a set of rules based on training data to be used by method (a), where such rules guarantee high recall and moderate precision;
(e) A method for selecting an optimal set of features to be used in the second stage of candidate verification;
(f) A method to reduce the number of training data required for supervised learning of a record deduplication model based on stratified sampling and active learning (compared to traditional one-shot, uniform sampling techniques); and
(g) A method that performs object linkage for multiple data sources where each data source contains more than one table and possibly complex relationships between tables.

A third feature is using crowd-sourcing to accomplish training of various components of the system.

More specifically, this feature involves the crowd being involved at any point in the workflow (e.g., feature extraction, similarity computation, linkage decision making).

BRIEF DESCRIPTION OF THE DRAWINGS

In the drawings, closely related figures and items have the same number but different alphabetic suffixes. Processes, states, statuses, and databases are named for their respective functions.

CONNECTING THE FIGURES

Figure 1:
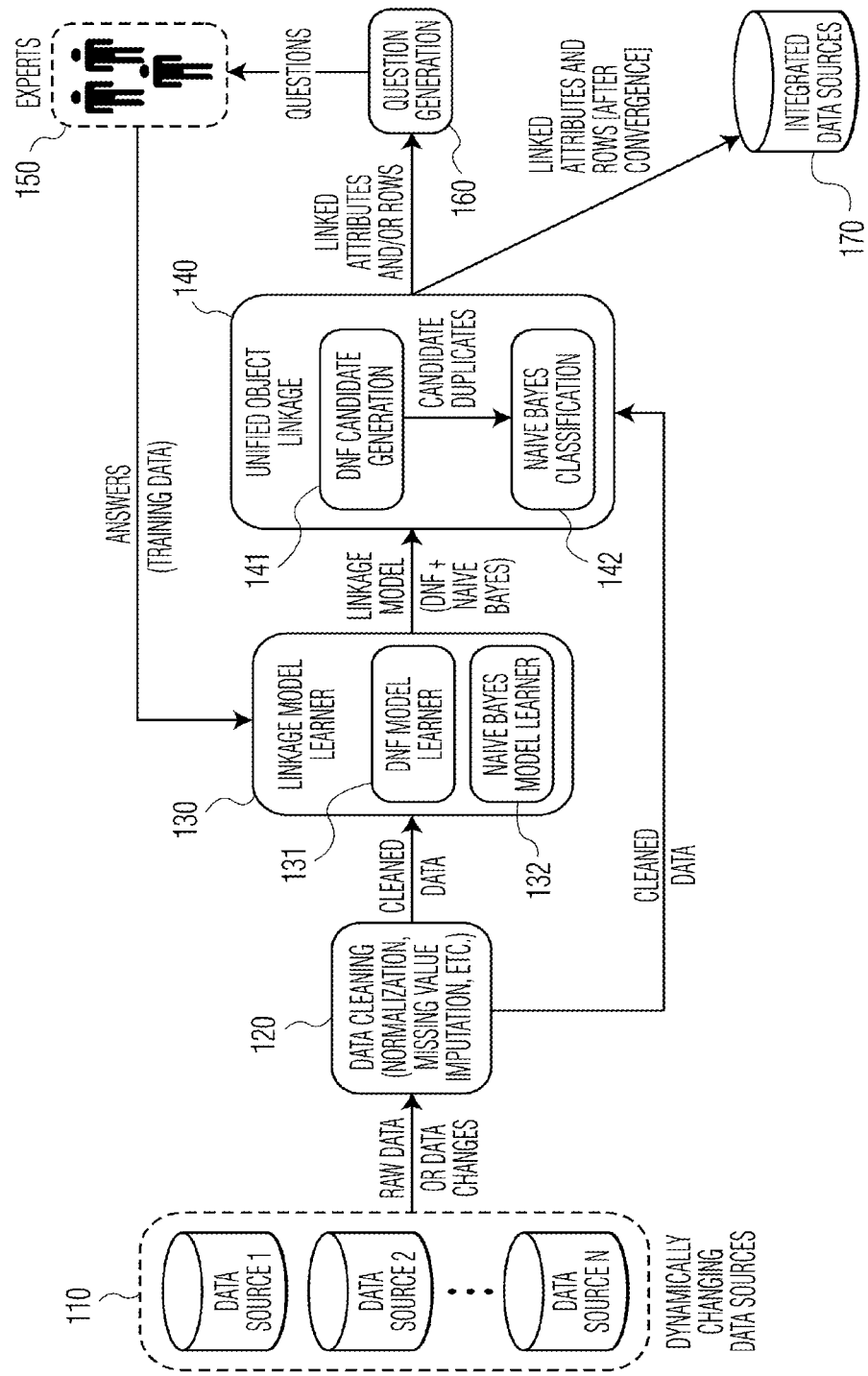
FIG. 1 is a data flow diagram for the system.

A. Model generator 370 in FIG. 3 is the same as model generator 130 in FIG. 1.
B. Classifier 360 in FIG. 3 is the same as classifiers 225-230 in FIG. 2 and is a component of object linkage 140 in FIG. 1.
C. Question selector 350 in FIG. 3 is the same as question generation 160 in FIG. 1.
D. Data experts 340 and data experts 325 in FIG. 3 are the same as data experts 150 in FIG. 1.

DETAILED DESCRIPTION OF THE INVENTION, INCLUDING THE PREFERRED EMBODIMENT

In the following detailed description of the invention, reference is made to the accompanying drawings which form a part hereof, and in which are shown, by way of illustration, specific embodiments in which the invention may be practiced. It is to be understood that other embodiments may be used, and structural changes may be made, without departing from the scope of the present invention.

Operation

Data curation is the act of (a) discovering a data source(s) of interest, cleaning and transforming the new data; (b) semantically integrating it with other local data sources; and (c) deduplicating the resulting composite.

Data integration is (a) mapping schemas of multiple data sources into one global schema, and (b) deduplicating records in such sources. In other words, data integration involves two object linkage exercises: column/field/attribute linkage and row/record linkage.

There has been much research on the various components of data curation (especially data integration and record deduplication). However, there has been little work on collecting all of the data curation components into an integrated end-to-end system. In addition, most of the previous work does not scale to the sizes of problems currently found in the field. For example, one web aggregator requires the data curation of 80,000 URLs, and a second biotech company has the problem of curating 8,000 spreadsheets. At this scale, data curation cannot be a manual (human) effort, but it must entail machine-learning approaches with a human assist only when necessary.

This system expects as input a sequence of (large) data sources to add to a composite being constructed over time. A new data source is subjected to machine learning algorithms to perform schema mapping, grouping of attributes into tables, data transformation of incoming data, and record deduplication. When necessary, a human can be asked for guidance. Also, this system includes a data visualization component, so that a system operator can examine a data source at will and specify manual data transformations.

The system described herein includes the following characteristics:

1. Scalability through automation. The size of the data integration problems we are encountering precludes a human-centric solution. Next generation systems will have to move to automatic algorithms with human help only when necessary. In addition, advances in machine learning and the application of statistical techniques can be used to make many of the easier decisions automatically.

2. Data cleaning. Enterprise data sources inevitably include raw data that is quite dirty/noisy. Attribute data may be incorrect, inaccurate, or missing. Again, the scale of future problems requires an automated solution with human help only when necessary.

3. Non-programmer orientation. Current Extract, Transform, and Load (ETL) systems have scripting languages that are appropriate for professional programmers. The scale of next generation problems requires that less skilled employees (e.g., system operators) be able to perform data integration tasks.

4. Incremental data integration and data curation. New data sources must be integrated incrementally as they are uncovered. There is never a notion of the data integration task being finished.

Overall Workflow

The overall workflow is shown in FIG. 1. The system includes computer hardware (not shown) and computer software. The preferred operating system is Linux, and any hardware that supports Linux can be used. The preferred database system is PostgreSQL, the preferred application server is Tomcat, and the preferred programming language is Java.

The main steps are as follows:

1. Raw data from dynamically changing data sources 110 undergoes data cleaning 120 (a sequence of data normalization and data transformation to standardize the data format).

2. Next, a linkage model learner component (model generator 130) constructs a linkage model (not numbered) from cleaned data (not numbered) from data cleaning 120 and answered questions (not numbered), such as training data and high level linkage criteria (not numbered), from data experts 150. Sub-modules of model generator 130 include DNF model learner 131, and Naïve Bayes model learner 132.

3. Once a linkage model is obtained by model generator 130, the linkage model is sent to object linkage 140, which links similar objects (not shown) together, where objects are abstract entities, such as records and columns in data sources. More specifically, column linkage is used for schema mapping, and row linkage is used for record deduplication. Linkage criteria are either specified directly by data experts 150 (output as high level linkage criteria) or learned through asking data experts 150 questions (output as answered questions).

4. The system uses an expert sourcing component (question generation 160) to generate and assign questions to one of, multiple of, or a crowd of data experts 150 such that a minimum quality of answered questions is met, given specific confidence levels about the accuracy of data experts 150. Also, question generation 160 collects answered questions from data experts 150 and consolidates answered questions.

5. The quality of the current linkage model is determined based on the answered questions received from data experts 150. If the quality is satisfactory, then the achieved linkage model is used for linking the data, and the linked data (i.e., each cluster of similar records is coalesced into one representative record) is written as integrated data sources to database 170. Otherwise, the collected answered questions are used to learn an improved linkage model, and the linkage process is repeated.

Unified Object Linkage

Previous techniques distinguish between the tasks of schema mapping (i.e., to find or to map to global schema) and record deduplication (i.e., to find duplicates or related records on the same real world entity). This system realizes the intrinsic interplay between these two tasks, where the continuously evolving global schema (learned from the input data sources) affects the decisions on linking records adhering to this schema. The core technology in this system employs a holistic method of linking real world entities (objects) that abstract both records and columns in the relational world. The purpose of the object linkage component is determining what objects are similar enough to be linked together. Both record deduplication and schema mapping become applications of this abstraction and are now performed holistically for providing maximum context and better incremental results.

In order to provide a unified linkage system, the following problems must be addressed:

First, at initial system startup, no attributes or records are linked. The system needs to create an initial linkage for either records or attributes. In practice, the number of similar record pairs is extremely low compared to all possible pairs. Such an imbalance between the number of linked record pairs and the number of unlinked pairs makes the process of finding a seed sample of linked record pairs more involved. Also, if the attribute names are not meaningful, then attribute linking at this stage could be difficult.

Second, generalizing record deduplication and schema mapping into a unified linkage framework requires abstracting the building blocks and the workflow of the linkage system to accommodate generic objects.

Third, learning a linkage model is a labor-intensive process. It is important to reduce the amount of required data expert feedback, while achieving a good classifier with reasonable quality guarantees. In general, it is necessary to reach a balance between the number of questions a data expert needs to answer and the quality of the constructed classifier.

Figure 2:
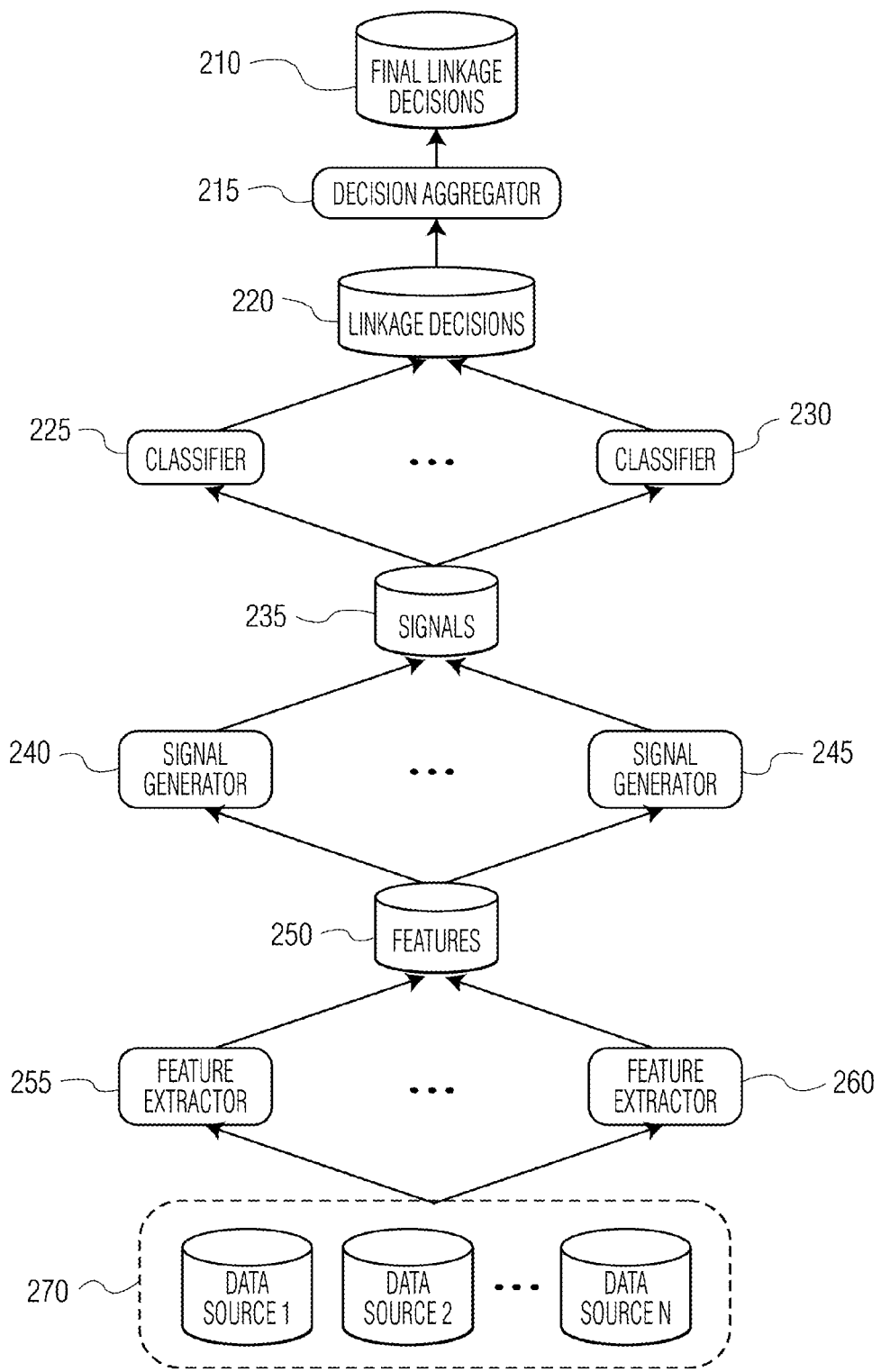
FIG. 2 is a data flow diagram for the record deduplication component.
Figure 3:
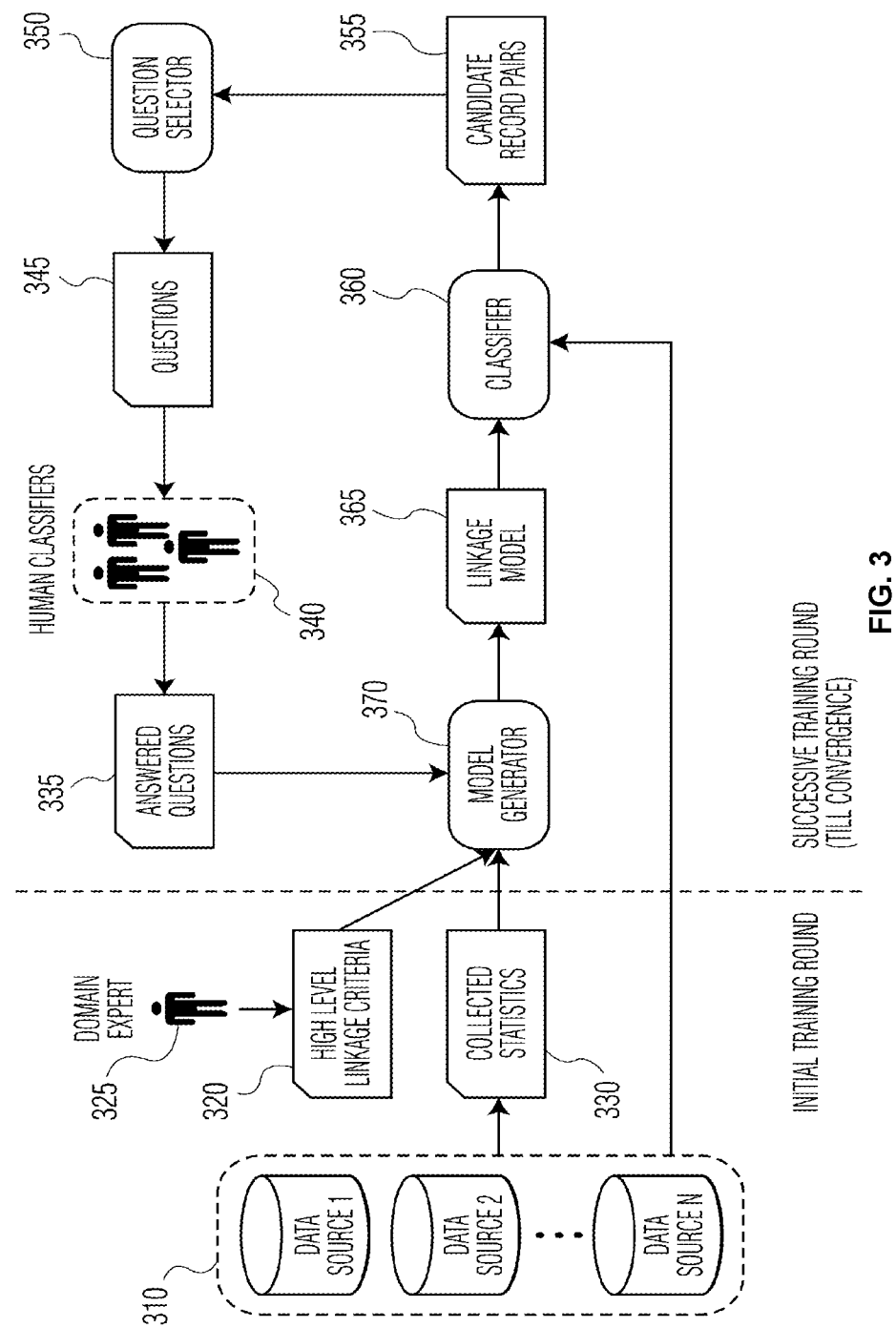
FIG. 3 is a data flow diagram for training record deduplication.

The architecture of the object linkage 140 is shown in more detail in FIG. 2. The first step is to extract multiple features 250 (e.g., Q-grams, stemmed tokens) of the objects to be linked. This is done by feature extractors 255-260 on data sources 270. Then, via signal generators 240-245, the system compares features of entity pairs and generates one or more signals 235, where each signal measures (e.g., using Euclidean distance, cosine similarity, and the edit distance) the similarity between two features 250. Then, via classifiers 225-230, the generated signals 235 are used for classifying pairs of objects as either linked or non-linked and stored as linkage decisions 220. Finally, decision aggregator 215 is used for consolidating the decisions obtained by classifiers 225-230 and to ensure that the linkage decisions 220 are consistent. For example, decision aggregator 215 ensures that linkage decisions 220 are transitive. That is, if two entities A and B are linked, and entities B and C are linked, then entities A and C must be linked as well. The output of decision aggregator 215 is final linkage decisions 210.

Classifiers 225-230 use two-step processing, where the first step retrieves a set of candidate pairs (i.e., pairs of objects), and the second step performs more elaborate verification/classification of each candidate. The first step, DNF candidate generation 141, uses a formula in disjunctive normal form (DNF) to define which candidates to retrieve. Each atom in the formula is a range predicate on a similarity signal. The second step, Naïve Bayes classification 142, uses a Naïve Bayes classifier to classify the candidate pairs.

Notations.

Given a set of attributes $A_1, \ldots, A_m$, we associate each attribute with one or more similarity metrics. For simplicity of discussion, we assume that each attribute $A_i$ is associated with a single similarity metric denoted $Sim_i$. Each similarity metric measures the similarity between two values of a given attribute. Without loss of generality, we assume that the range of $Sim_i(v_1, v_2)$ is [0,1], where 0 indicates that $v_1$ and $v_2$ are completely dissimilar, and 1 indicates that $v_1$ and $v_2$ are identical.

Candidate Generation.

The first step in object linkage is obtaining a set of object pairs that are possibly linked while pruning all object pairs that are known to be non-linked. This step allows significant performance improvement since we reduce the number of object pairs that need to be considered. One possible implementation of candidate generation is to use a Boolean formula in disjunctive normal form (DNF) (DNF candidate generation 141) to retrieve possibly linked objects. The formula is constructed such that most of the actually linked pairs satisfy the formula while a minimal number of non-linked pairs satisfy the formula. The Boolean formula has the following canonical form:

$$((Sim_a \geq T_a) \text{ AND } (Sim_b \geq T_b) \text{ AND } \ldots .)$$
$$\text{OR}$$
$$((Sim_i \geq T_i) \text{ AND } (Sim_j \geq T_j) \text{ AND } \ldots .)$$
$$\text{OR}$$
$$\ldots$$
$$((Sim_y \geq T_y) \text{ AND } (Sim_z \geq T_z) \text{ AND } \ldots .)$$

Formula 1

Only the pairs of records that satisfy Formula 1 are possible candidates. The parameters to be learned are the similarity metrics ($Sim_a, \ldots, Sim_z$), as well as the similarity thresholds ($T_a, \ldots, T_z$).

The candidate-generating formula is constructed based on training data. Training data is a set of record pairs that are pre-labeled as either linked or non-linked. The algorithm constructs the formula in a greedy way. More specifically, we obtain a clause at a time that maximizes the recall as much as possible while not reducing the precision. We continue discovery of DNF clauses until a reasonable recall is reached (e.g. above 99% of known linked pairs are obtained).

Pairs that satisfy a DNF model are obtained as follows. For each clause (($Sim_a \geq T_a$) AND ($Sim_b \geq T_b$) AND . . . ), we create full-text indices on attributes $A_a, A_b, \ldots$ .

Then, we search for pairs satisfying ($Sim_a \geq T_a$) using the index on $A_a$. Similarly, we obtain the pairs satisfying all remaining conditions in the clause. The pairs satisfying clause $((Sim_a \geq T_a)$ AND $(Sim_b \geq T_b)$ AND ...) are obtained by computing the intersection (logical AND) of the retrieved candidate sets.

We repeat this process for all clauses in the DNF, and we compute the union of the resulting sets, which represents the set of entity pairs that could be possibly linked.

Naïve Bayes Model.

In the second step (Naive Bayes classification 142), we use a Naive Bayes classifier to check whether a pair of entities should be linked or not. In the following, we describe how to learn a Naive Bayes classifier given a set of training data. Training data consists of a set of record pairs that are labeled as "linked", denoted M, and a set of record pairs that are labeled as non-linked, denoted U. For each attribute $A_i$, we learn the conditional probability of a given value of $Sim_i$ for two randomly selected records, given that the two records are linked, denoted $Pr(Sim_i=s|M)$, where s could be a real value or null (indicating that at least one of the records has $A_i$=null). We also learn the conditional probability $Pr(Sim_i=s|U)$, where U indicates that the two selected records are non-linked.

Using these probability distributions, we can compute the probability that two records are duplicates given their attribute similarities, denoted $Pr(M|SimA, ..., SimZ)$, based on Naïve Bayes rule:

$$Pr(M|Sim_1=s_1,...,Sim_n=s_n)=1/Z(Pr(M)\cdot Pr(Sim_1=s_1|M)...Pr(Sim_n=s_n|M)) \quad \text{Formula 2:}$$

$$Pr(U|Sim_1=s_1,...,Sim_n=s_n)=1/Z(Pr(U)\cdot Pr(Sim_1=s_1|U)...Pr(Sim_n=s_n|U)) \quad \text{Formula 3:}$$

Where Z is a data normalization constant.

Learning Linkage Models.

FIG. 3 shows the high level architecture of the knowledge transfer system. Initially, the system has access to N data sources 310, each of which contains multiple records. There are mainly two modes of operations: initialization mode (initial training round, the side to the left of the dotted line in FIG. 3) and iterative learning mode (successive training rounds, the side to the right of the dotted line in FIG. 3).

In the model initialization mode, no linkage model is present. Via model generator 370, the system creates an initial linkage model 365 given records in the available data sources 310, collected statistics 330, and high-level linkage criteria 320 provided by domain data experts 325.

In the iterative learning mode, the system improves the existing linkage model 365 based on questions 345 generated by question selector 350, answered by human classifier data experts 340, and output as answered questions 335. Such improvement steps continue until the system cannot find better model, or when the quality specifications defined by the system operator (not shown) are met.

Statistics-Based Initial DNF Model.

The first step in building an initial model is collecting data statistics. For each attribute $A_i$, we compute the distribution of $Sim_i$. One way to estimate such distribution is to collect a random sample of record pairs and compute the attribute similarity of sampled pairs.

We assume that the data expert provides an estimated number of linked records in the available data. For example, given a data set with N records, and assuming that each records is linked to d records in average, we compute the probability that two random records are linked (denoted Pr(M)) as follows:

$$Pr(M)=(d*N/2)/(N*(N-1)/2)=d/(N-1) \quad \text{Formula 4:}$$

Figure 4:
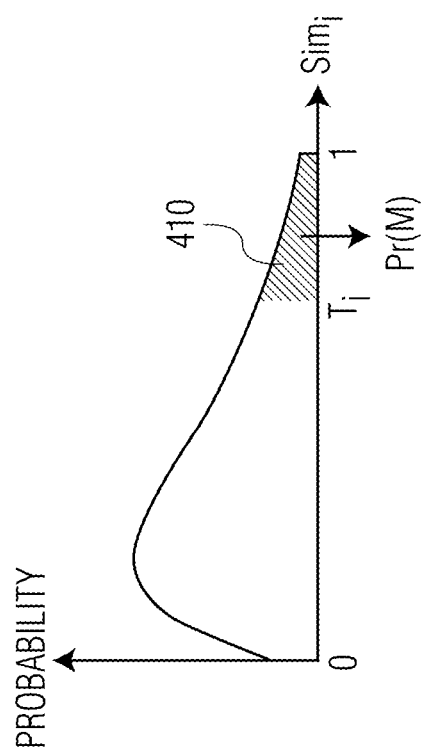
FIG. 4 shows how to obtain similarity thresholds based on data statistics.

FIG. 4 shows the criteria for selecting threshold $T_i$ for similarity metric $Sim_i$ as part of constructing candidate generation DNF. We set $T_i$ to the minimum similarity value v, such that the percentage of record pairs with similarity greater than or equal to v is less than or equal to Pr(M) 410.

$$T_i = \min\arg_v(Pr(Sim_i \geq v) \leq Pr(M)) \quad \text{Formula 5:}$$

Note that such criteria might not be satisfied for some attributes. For example, consider the "State" attribute in a database of organizations. The maximum similarity values, which is 1, cannot satisfy the condition $Pr(Sim_i \geq 1) \leq Pr(M)$, since the number of record pairs with the same state value is much larger than the expected percentage of record pairs to be linked.

Given a set of thresholds $T_1, ..., T_z$ for a similarity metric $Sim_1, ..., Sim_z$, we could construct an initial linkage model as follows:

$$(Sim_1 \geq T_1) \text{ OR } (Sim_2 \geq T_2) \text{ OR } ... \text{ OR } (Sim_z \geq T_z) \quad \text{Formula 6:}$$

That is, each clause of the model formula contains a single condition $Sim_i \geq T_i$. We generalize our method to allow clauses with at most k attributes as follows. We consider all combinations of k distinct similarity metrics or less. Let $Sim_1, ..., Sim_k$ be one of such combinations. For each combination, we search for a set of thresholds $T_1, ..., T_k$ such that:

$$Pr(Sim_1 \geq T_1 \text{ AND } Sim_2 \geq T_2 \text{ AND } ... \text{ AND } Sim_k \geq T_k) \leq Pr(M) \quad \text{Formula 7:}$$

and $$Pr(Sim_1 \geq T_1 \text{ AND } Sim_2 \geq T_2 \text{ AND } ... \text{ AND } Sim_k \geq T_k)$$
is maximum  Formula 8:

Once we obtain all combinations, along with the appropriate thresholds, we construct linkage model 365 as follows:

$$((Sim_{11} \geq T_{11}) \text{ AND } ... \text{ AND } (Sim_{1k} \geq T_{1k})) \quad \text{Formula 9}$$
$$\text{OR}$$
$$((Sim_{i1} \geq T_{i1}) \text{ AND } ... \text{ AND } (Sim_{ik} \geq T_{ik}))$$
$$\text{OR}$$
$$...$$
$$\text{OR}$$
$$((Sim_{z1} \geq T_{z1}) \text{ AND } ... \text{ AND } (Sim_{zk} \geq T_{zk}))$$

Using Expert Hints for Initializing Linkage Model.

Due to the large search space of the linkage model and the limited computational capacity, it might not be possible to obtain an accurate model that retrieves all linked record pairs. If a data expert is available, then he/she could provide hints to the system as well as revising the suggested clauses that are obtained using data statistics.

A data expert is expected to provide (semi-)keys, where each semi-key, denoted SKi, is represented as a condition $(Sim_1 \geq T_1 \text{ AND } ... \text{ AND } Sim_k \geq T_k)$. We say that if a pair of records satisfies the associated condition, then the pair of records satisfies a semi-key. Each semi-key has a potential precision and recall. More specifically, the precision of a semi-key is the expected percentage of truly linked pairs within all pairs satisfying the semi-key. The recall of a semi-key is the expected percentage of truly linked pairs that satisfy the semi-key. That is:

$$\text{Precision}(SK_i) = |\{(r_p, r_q) \in D \times D : r\_p \approx r\_q \text{ AND }$$
$$(r_p, r_q) \models SK_i\}|/|\{(r_p, r_q) \in D \times D : (r_p, r_q) \models SK_i\}| \quad \text{Formula 10:}$$

$$\text{Recall}(SK_i) = |\{(r_p, r_q) \in D \times D : r\_p \approx r\_q \text{ AND}$$
$$(r_p, r_q) \models SK_i\}| / |\{(r_p, r_q) \in D \times D : r\_p \approx r\_q\}| \quad \text{Formula 11:}$$

where $r_p \approx r_q$ indicates that records $r_p$ and $r_q$ should be linked, and $(r_p, r_q) \models SK_i$ indicates that $(r_p, r_q)$ satisfies $SK_i$.

For a set of semi-keys, the collective recall is the percentage of truly linked pairs that satisfy any of the semi-key conditions. In general, the data expert is expected to provide a set of semi-keys such that:

A. The precision of individual semi-keys is moderate (e.g., above 50%); and

B. The recall of all semi-keys is high (e.g., above 95%).

The initial DNF model is constructed by obtaining the union of clauses obtained by a data expert and the clauses obtained using data statistics.

Question Generation and Selection.

Once an initial linkage model 365 is obtained, successive training rounds are directed towards improving the existing model. To achieve this goal, we need to generate a set of candidate record pairs 355 and present them to data experts 340.

In order to generate a set of candidate record pairs 355, we select a small sample of records in the database, and we link them based on the current linkage model 365. We select a small subset of candidate record pairs using a "stratified sampling" method as follows:

We partition the generated record pairs into bins, such that each bin has a specific similarity range or specific similarity values for metrics $\text{Sim}_1, \ldots, \text{Sim}_m$.

We select a number of questions from each bin proportional to the square root of the bin size multiplied by the variance of the labels in the bin. Since all pairs in bins are initially unlabeled, we need to pre-label a subset of the questions in each bin in order to estimate the variance of the labels.

Once we obtain a set of questions, we send them to the data expert(s) for labeling. The labeled questions are then used for generating an enhanced linkage model 365.

The iterative training continues until we reach one of the following conditions:

A. The precision and recall of the current linkage model (based on the data expert's labels) are above the minimum precision and recall that are required by a system operator; or B. The precision and recall of the model did not significantly change in the most recent rounds, which indicates the training process has converged.

Interaction Between Record Deduplication and Schema Mapping

Figure 5:
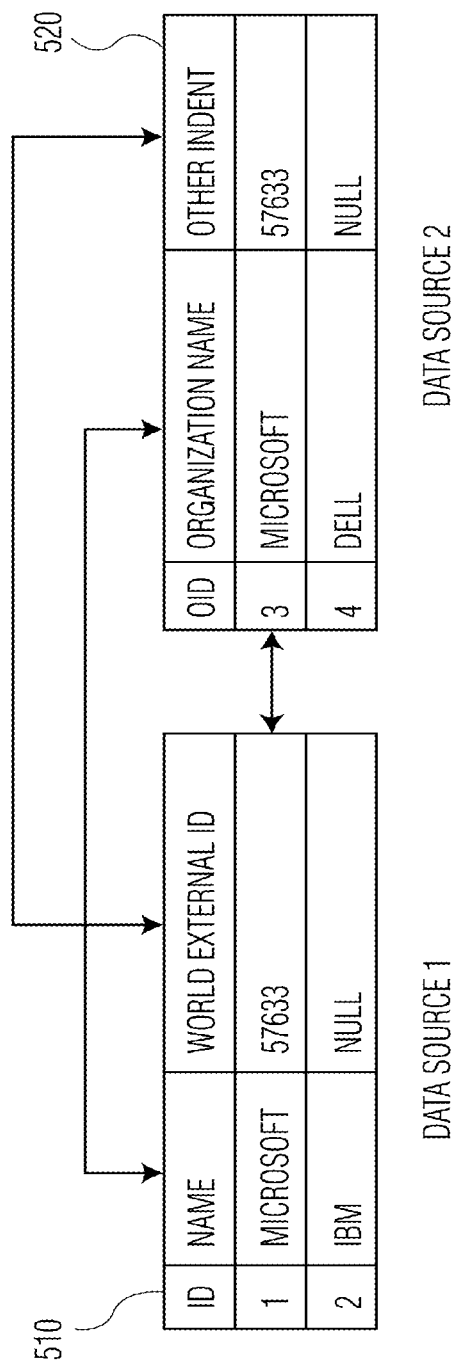
FIG. 5 shows an example of the dependency between schema mapping and record deduplication.

Most current data integration systems perform schema mapping and record deduplication as separate tasks. However, the resulting linkage could be sub-optimal due to having incomplete information about linkage of other related objects. Consider the example in FIG. 5, where data from two data sources (data source 510 and data source 520) are to be integrated. Considering the schema mapping in isolation of record deduplication could miss the link between the attributes "World External ID" and "Other Ident", as their labels are not similar and their values could be not significantly overlapping due to the small number of duplicates. However, taking the linkage between the records in data source 510 and data source 520, it is possible to identify linkage between the attributes "World External ID" and "Other Ident". For example, the two attributes have the same value in the first record in data source 510 and the first data record in data source 520, which are known duplicates. Having these two attributes mapped to each other could help finding additional record deduplication candidates that have similar values of "World External ID" and "Other Ident".

We introduce a method that addresses the interaction between schema mapping and record deduplication as follows. First, we start with either a naïve schema mapping or a naïve set of duplicates. For example, a naïve schema mapping could be based on similarity between attribute labels, distance between value distributions, and overlapping between attribute values. On the other hand, a naïve record deduplication might concatenate all attributes into a bag of words, and use the textual similarity to determine which record pairs are duplicates. Given an initial schema mapping or an initial set of duplicates, we compute better record deduplication results, or schema mapping, respectively. For example, an initial schema mapping provides higher-quality signals to the record deduplication module. Also, having a set of duplicate records allows obtaining attribute mappings that cannot be obtained based on attribute labels or attribute distribution.

Discovery of Global Schema

In several scenarios, the global schema (a.k.a. mediated schema or target schema) that covers the local schemas of all data sources is either not complete, or even non-existing. Moreover, as new data sources arrive, the current global schema has to be extended to accommodate new attributes.

Discovering global schema is handled through our unified linkage algorithms as follows. Each column in a data source is represented as an object with the following features:

A. The column name.

B. The distribution of the values in the column (in case of numeric columns).

C. The most frequent words appearing in the column.

For two given columns, the following signals are defined accordingly:

A. The cosine similarity between the column names.

B. The correlation between the column distributions (e.g., using t-student test, or KL-divergence).

C. The cosine similarity between the most frequent words in the columns.

Also, based on the discussion in the "Interaction Between Record Deduplication And Schema Mapping" section, we compute an additional signal between the two columns that represents the average distance between the column values for pairs of records that belong to the two data sources and are known to be duplicates.

The unified records linkage algorithm is used for aggregating the computed signals and obtaining a clustering of columns. Each cluster represents a set of columns that are believed to be semantically the same. Therefore, each cluster represents one attribute in the global schema.

One important constraint on the linkage output is that different columns that belong to the same data source cannot be in the same cluster. Such constraint is enforced during the clustering stage of the unified linkage process.

As new data sources arrive, the clustering is updated (e.g., using any incremental clustering algorithm) to reflect the current global schema.

Expert Sourcing

Many of the components in this system require high-quality human feedback (e.g., learning a linkage model). The expert sourcing component provides a marketplace for registering tasks, assigning workers to tasks so that quality and cost requirements are met, tracking worker performance, and consolidating worker responses.

Each task, denoted $t_i$, poses a multiple-choice question that must be completed by a a data expert or a group of data experts. Additionally, each task registered in the system is associated with a required confidence, which represents the probability that the consolidated answer returned by the expert sourcing module is correct.

Tasks are categorized into configurable subject matter domains, denoted $d_j$.

Modeling Data Expertise.

To get an initial estimate of each data expert's ability in each domain, we assign each expert a set of training tasks for which we already have high quality answers. The set of these "gold standard" questions, denoted $G_j$, are used to compute an estimated accuracy $a_{ij}$ for each expert in each subject matter domain.

Let $c_{ij}$ be the number of training tasks for which expert $e_i$'s response matches the corresponding "gold" response in domain j. Thus, $a_{ij}=c_{ij}/|G_j|$.

After an expert has completed training in a given domain, he/she can be assigned tasks in the domain.

Assigning Tasks to Experts.

Each expert has a workload limit $W_{ij}$, which represents the number of tasks the worker can complete in a given time period (e.g., one week) in domain $d_j$. At most $W_i$ tasks can be assigned to worker $e_i$ within the specified time period.

To ensure that tasks are answered with a high enough confidence, we select groups of workers to complete tasks redundantly. This has the effect of also balancing the task workload over the collection of workers; it ensures that the highest-rated experts are not overloaded with tasks.

To select a group of workers for a particular task, we estimate the probability that the group of workers will successfully complete the task. This is the posterior probability of a choice being correct given a worker response. Expected confidence in a group of workers is found by considering all possible correct answers and all possible responses from a given group of workers using the following:

$$E[Pr(C|R)]=\Sigma_C\Sigma_R Pr(C,R)\cdot Pr(C|R) \quad \text{Formula 12:}$$

Observe that:

$$Pr(C|R)=Pr(R|C)\cdot Pr(C)/(\Sigma_C Pr(R|C)\cdot Pr(C)) \quad \text{Formula 13:}$$

Similarly, observe that $Pr(R|C)=\pi C\ Pr(r_i|C)$, where $Pr(r_i|C)=a_{ij}$ if worker $r_i$'s response=C, $(1-a_{ij})$, if worker's $r_i$'s response !=C, and 1 if worker $r_i$ did not respond to the question.

We then must select the group of workers with either the highest expected confidence subject to budget constraints, where the budget is defined in terms of the number of assigned workers, or the smallest number of workers subject to confidence constraints.

Consolidating Responses.

Recall that for each question, we are given a confidence threshold. We accept a choice as the correct answer when the quantity Pr(C|R) (described above) is greater than a specified threshold.

This response is then used in the same manner as a "gold" response to update the data expert's estimated accuracy in the task's domain.

Other Embodiments

Another embodiment includes continuous training. Traditional curation systems that depend on supervised machine learning distinguish between "training mode," where they collect expert answers to construct a linkage model, and "execution mode," where they use the learnt model to perform object linkage. This feature removes such distinction by having the system in a continuous training mode, where the system provides linkage results almost immediately after inserting data sources, and keeps improving the linkage model and the linkage results upon receiving expert feedback. This feature ensures that there is virtually no down time where linkage results are unavailable due to being in training mode.

Another embodiment includes supporting multiple entity types and relationships. Most data integration systems assume that each data source contains one table that contains only one entity type (e.g., a table of employees). However, data sources, in practice, are more complex and contain multiple interconnected entity types (e.g., a data source may contain a table about employees, a table about departments, and a table about projects). Our system extends the traditional data integration techniques to handle data sources with multiple entity types that are connected through multiple relationships. For example, a schema mapping algorithm searches for similar entity types in different data sources before mapping their attributes. Also, the system uses the relationships between entities to improve the entity resolution quality. For example, it may use the fact that two employee records refer to the same department as evidence that they are duplicates.

Another embodiment includes distributed object linkage. Traditional curation systems use a single machine to perform data integration. In order to scale up to billions of entities, our system uses multiple machines to perform its functions. In order to achieve that, data that is received from various sources is carefully distributed among the available machines. The main distribution criterion is having an insignificant number of similar entities that are located in different machines. Therefore, object linkage can be performed independently on the various machines.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer implemented method for integrating one or more database storage sources by performing object linkage in computer memory on object pairs from the one or more database storage sources, in order to separate the object pairs into linked object pairs and non-linked object pairs, comprising:

constructing an initial linkage model configured to generate and classify candidate object pairs from the one or more database storage sources, wherein the candidate object pairs include both schema mappings and record duplicates;

generating candidate object pairs;

classifying the candidate object pairs as linked object pairs or non-linked object pairs using the initial linkage model;

selecting a subset of the candidate object pairs using stratified sampling to send to data experts for labeling;

constructing an enhanced linkage model based on the candidate object pairs labeled by data experts;

classifying the candidate object pairs as linked object pairs or non-linked object pairs using the enhanced linkage model;

producing a global schema for an integrated data source based on the linked object pairs that are schema mappings, wherein each cluster of linked objects in schema mapping linked object pairs represents one attribute within the global schema; and deduplicating by coalescing linked object pairs that are record duplicates, wherein each cluster of linked objects in record duplicate linked object pairs represents one record within the integrated data source.

2. The method of claim 1, wherein each of the database storage sources are relational databases.

3. The method of claim 1 wherein the classifying is performed through a Naive Bayes classifier.

* * * * *